(12) United States Patent
Yoon

(10) Patent No.: US 9,703,765 B2
(45) Date of Patent: Jul. 11, 2017

(54) DATA DISPLAY APPARATUS AND METHOD FOR ENERGY MANAGEMENT SYSTEM

(71) Applicant: LSIS CO., LTD., Anyang-si, Gyeonggi-do (KR)

(72) Inventor: Yeo Chang Yoon, Seoul (KR)

(73) Assignee: LSIS CO., LTD., Anyang-si (KR)

( * ) Notice: Subject to any disclaimer, the term of this patent is extended or adjusted under 35 U.S.C. 154(b) by 90 days.

(21) Appl. No.: 14/597,581

(22) Filed: Jan. 15, 2015

(65) Prior Publication Data
US 2015/0213000 A1 Jul. 30, 2015

(30) Foreign Application Priority Data
Jan. 27, 2014 (KR) .......... 10-2014-0009699

(51) Int. Cl.
*G06F 17/24* (2006.01)

(52) U.S. Cl.
CPC .......... *G06F 17/245* (2013.01); *G06F 17/243* (2013.01)

(58) Field of Classification Search
CPC .............................. G06F 17/245; G06F 17/243
See application file for complete search history.

(56) References Cited

U.S. PATENT DOCUMENTS

| 5,355,505 A | 10/1994 | Suzuki |
| 7,143,339 B2 | 11/2006 | Weinberg et al. |
| 2009/0049372 A1* | 2/2009 | Goldberg .............. G06F 17/245 715/227 |
| 2013/0007658 A1* | 1/2013 | Loughlin .............. G06F 3/0483 715/810 |
| 2014/0089830 A1* | 3/2014 | Winkle ............. G06F 17/30398 715/769 |

FOREIGN PATENT DOCUMENTS

KR  10-2013-0127216  11/2013

OTHER PUBLICATIONS

European Patent Office Application Serial No. 15151114.4, Search Report dated Aug. 3, 2015, 6 pages.

* cited by examiner

*Primary Examiner* — Scott Baderman
*Assistant Examiner* — Seung Jung
(74) *Attorney, Agent, or Firm* — Lee, Hong, Degerman, Kang & Waimey PC

(57) ABSTRACT

The present disclosure relates to a data display method and a data display apparatus for an energy management system. The data display method according to the present disclosure comprises receiving a table generation request signal for data received from a data acquisition and management system, receiving a table display form and selection information of sorting, receiving at least one layer according to a selected table display form, sorting and displaying the received data according to the input table display form and the input layer, sensing a sorting request signal for the displayed data, and re-sorting and displaying the displayed data based on the received sorting request signal.

2 Claims, 16 Drawing Sheets

DATA DISPLAY APPARATUS AND METHOD FOR ENERGY MANAGEMENT SYSTEM

CROSS-REFERENCE TO RELATED APPLICATION

Pursuant to 35 U.S.C. §119(a), this application claims the benefit of earlier filing date and right of priority to Korean Application No. 10-2014-0009699, filed on Jan. 27, 2014, the contents of which is incorporated by reference herein in its entirety.

BACKGROUND OF THE DISCLOSURE

1. Field of the Disclosure

The present disclosure relates to an apparatus and method for displaying data of an energy management system.

2. Background of the Disclosure

An energy management system is a system in which information technology is applied to energy safety management, and is a monitoring system in which a plurality of management systems for safety of electricity and a gas are established, and safety monitoring technology is applied by connecting the management systems.

As described above, a plurality of management systems that engage a plurality of management and monitoring apparatuses manage various data collected from corresponding apparatuses, and display the collected data in a certain form for monitoring.

Generally, acquired data is displayed in a tabular form. In order to implement such a display method, a user separately edits reference data according to a predetermined tabular form to reconstruct the reference data to be matched with the predetermined tabular form.

Therefore, a new tabular form cannot be generated when an energy management system is operating. Also, in order to generate a new tabular form, a user should edit a table in a predetermined form to construct a separate table at a time when operating of a system ends or temporarily stops. Also, in a predetermined table editing form or a data sorting method, only when a new table is generated, data is sorted in various forms according to a user's convenience, and display is impossible.

SUMMARY OF THE DISCLOSURE

Therefore, an object of the present disclosure is to provide a data display apparatus and method for an energy management system, which express data, acquired from the energy management system, in a tabular form to generate data in various tabular forms without separately editing the existing data.

Another object of the present disclosure is to provide a data display apparatus and method for an energy management system, which enable a user to easily change and add a display form of a table by directly using a tabular User Interface (can be abbreviated as UI) while a system is operating.

To achieve these and other advantages and in accordance with the purpose of this specification, as embodied and broadly described herein, a data display method for an energy management system, the data display method comprising:

inputting, by a user input unit, a table generation request signal for data received from a data acquisition and management system;

inputting, by the user input unit, a table display form and selection information of sorting;

inputting, by the user input unit, at least one layer according to a selected table display form;

performing, by a control unit, control to sort the received data according to the input table display form and the input layer, and displaying the sorted data in a display unit;

receiving, by the control unit, a sorting request signal for the displayed data; and performing, by the control unit, control to re-sort the displayed data based on the received sorting request signal, and displaying the re-sorted data in a display unit, wherein, in a case where the selected table display form is a hierarchical table for displaying data classified as an uppermost layer to a lowermost layer, and the displayed hierarchical table includes data of a plurality of first hierarchical tables, when a sorting request signal for the plurality of first hierarchical tables is input, the control unit is configured to re-sort the first hierarchical table based on data of the plurality of first hierarchical tables, and to display the re-sorted first hierarchical table in the display unit, when data of a first hierarchical table is re-sorted, the control unit is configured to control the display unit so that data of a lower hierarchical table is displayed at a lower position in correspondence with a re-sorting order of the first hierarchical table, and when a re-sorting request signal for data of the lower hierarchical table is sensed, the control unit is configured to re-sort data of a selected lower hierarchical table in a first hierarchical table including data of the selected lower hierarchical table, and the control unit is configured to control the display unit to display the re-sorted data.

According to another aspect of the present disclosure, the data display method according to the present disclosure further comprising:

inputting, by the user input unit, a table to be displayed on a repeated layer when the selected table display form is a repetition table in which data are listed and displayed in one direction;

reading, by the control unit, data included in the input table; and performing, by the control unit, control so that a table generation unit generates the read data in the selected repetition table form according to control by the control unit.

According to still another aspect of the present disclosure, the repetition table is configured with a table in which data included in the input table are displayed in a width direction or a height direction.

According to still another aspect of the present disclosure, the data display method according to the present disclosure further comprises:

inputting, by the user input unit, a table to be displayed in a tree form when the selected table display form is the hierarchical table;

reading, by the control unit, data included in the input table; and performing, by the control unit, control so that a table generation unit generates the read data in a form of the selected hierarchical table.

According to still another aspect of the present disclosure, a table input to be displayed in the tree form is configured as a plurality of hierarchical tables to be displayed are sequentially input in the tree form.

Further scope of applicability of the present application will become more apparent from the present disclosure given hereinafter. However, it should be understood that the present disclosure and specific examples, while indicating preferred embodiments of the disclosure, are given by way of illustration only, since various changes and modifications within the spirit and scope of the disclosure will become apparent to those skilled in the art from the present disclosure.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings.

DETAILED DESCRIPTION OF THE DISCLOSURE

Description will now be given in detail of the exemplary embodiments, with reference to the accompanying drawings. For the sake of brief description with reference to the drawings, the same or equivalent components will be provided with the same reference numbers, and description thereof will not be repeated.

Hereinafter, embodiments of the present invention will be described in detail with reference to the accompanying drawings.

Figure 1:
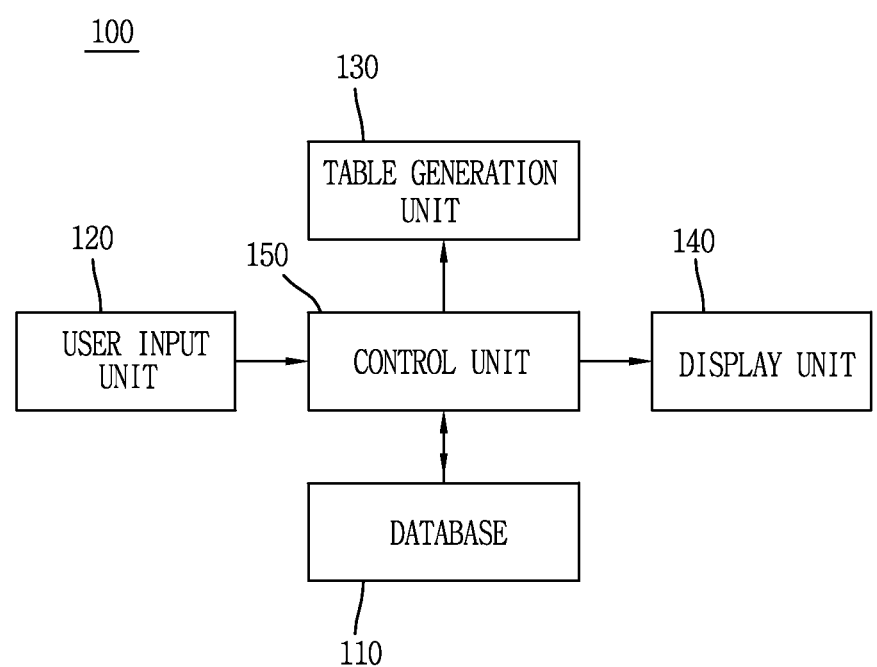
FIG. 1 is a block diagram of a table generation apparatus that implements a data display method for an energy management system, according to an embodiment of the present invention.

FIG. 1 is a block diagram of a table generation apparatus that implements a data display method for an energy management system, according to an embodiment of the present invention.

Referring to FIG. 1, a table generation apparatus 100 according to an embodiment of the present invention may be included in a control system, such as an energy management system, or a monitoring system that monitors data acquired from the control system.

The table generation apparatus 100 comprises a database 110, a user input unit 120, a table generation unit 130, a display unit 140, and a control unit 150.

The database 110 stores data received from a data acquisition and management system such as an energy management system or a Supervisory Control and Data Acquisition (can be abbreviated as SCADA) system. Also, the database 110 may include a tabular form using the data, table generation data based on the tabular form, and data for a sorting method.

As a user interface of the table generation apparatus 100, the user input unit 120 provides a means that enables a user to input a table display request signal for data which is received from a data acquisition and management system such as the energy management system and is stored in the database 110.

Moreover, in response to manipulation of a user, the user input unit 120 may input a table generation item for table display, and in detail, the user input unit 120 may be configured with a key switch or a touch switch. The user may input, for example, various items such as a tabular form, a table to be generated, and a layer through the user input unit 120. In particular, in response to manipulation of the user, the user input unit 120 may input a data sorting method in a table display form at a time when a table is generated or at a time when the table is displayed.

The table generation unit 130 generates the data, stored in the database 110, into a table according to control by the control unit 150, based on a table generation item which is input through the user input unit 120. The table generation unit 130 may generate a repetition table or a hierarchical table according to a tabular form request which is input through the user input unit 120.

In generating the hierarchical table, the table generation unit 130 may generate a hierarchical table from a uppermost hierarchical table to a lowermost hierarchical table which are sequentially input from the user input unit 120.

In generating the repetition table, the table generation unit 130 may generate a table so that data included in an input table are listed widthwise or lengthwise. Based on user input information which is input through the user input unit 120, the table generation unit 130 may supply a data sorting form to the control unit 150 so as to change and display a data sorting form in generating a table or in displaying the table.

The display unit 140 displays a table generated by the table generation unit 130 according to control by the control unit 150. In particular, based on an input from the user input unit 120, the display unit 140 may display the table, generated by the table generation unit 130, in a predetermined form and a sorting form according to control by the control unit 150.

The control unit 150 may receive a table generation request signal which is input through the user input unit 120, and in response to the table generation request signal, the control unit 150 may control the table generation unit 130 so as to generate a table, based on the table generation item which is input through the user input unit 120. Also, the control unit 150 may control the display unit 140 in order for the display unit 140 to display the table generated by the table generation unit 130. Also, in generating or displaying a table, the control unit 50 may receive user request information about a data sorting form which is input through the user input unit 120, and control the table generation unit 130 and the display unit 140 so as to re-sort and display data in a sorting form corresponding to the user request information.

A data display method for an energy management system according to an embodiment of the present invention will be described in detail with reference to FIGS. 2 to 16, based on a configuration of the table generation apparatus that is a means for executing the data display method for the energy management system according to an embodiment of the present invention.

Figure 2:
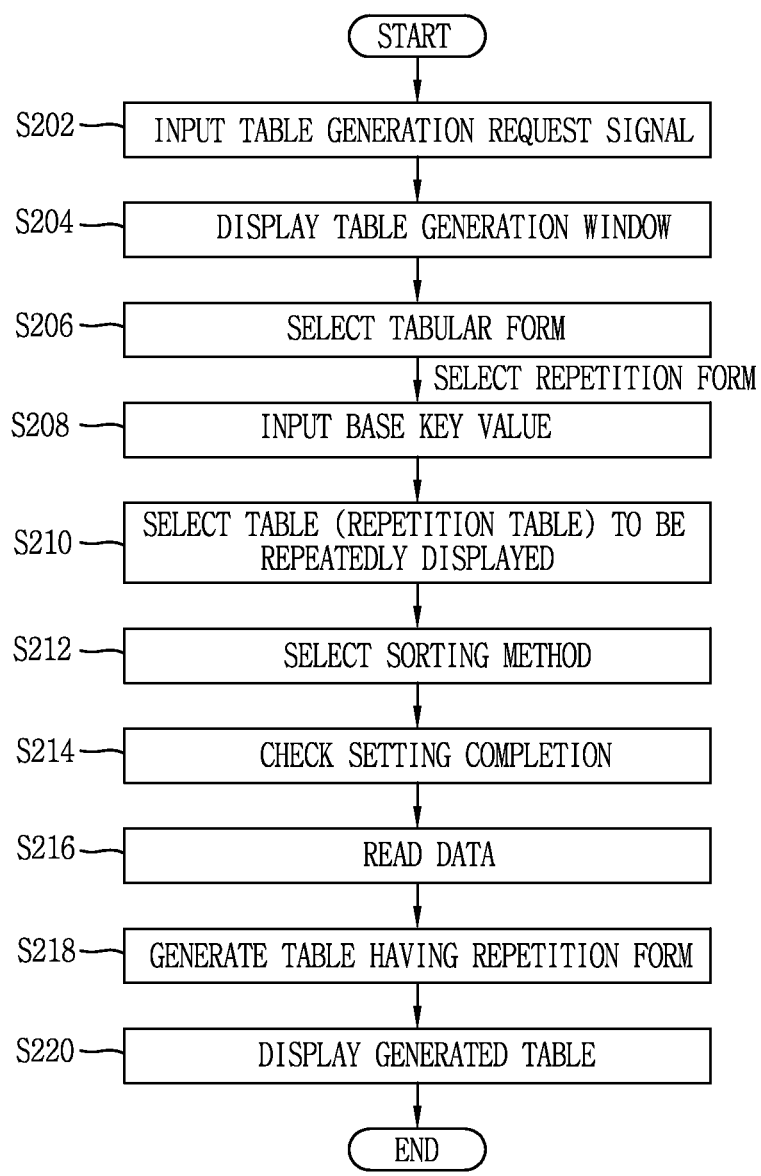
FIG. 2 is a flowchart illustrating a repetition table display operation according to a preferred embodiment of the present invention.
Figure 3:
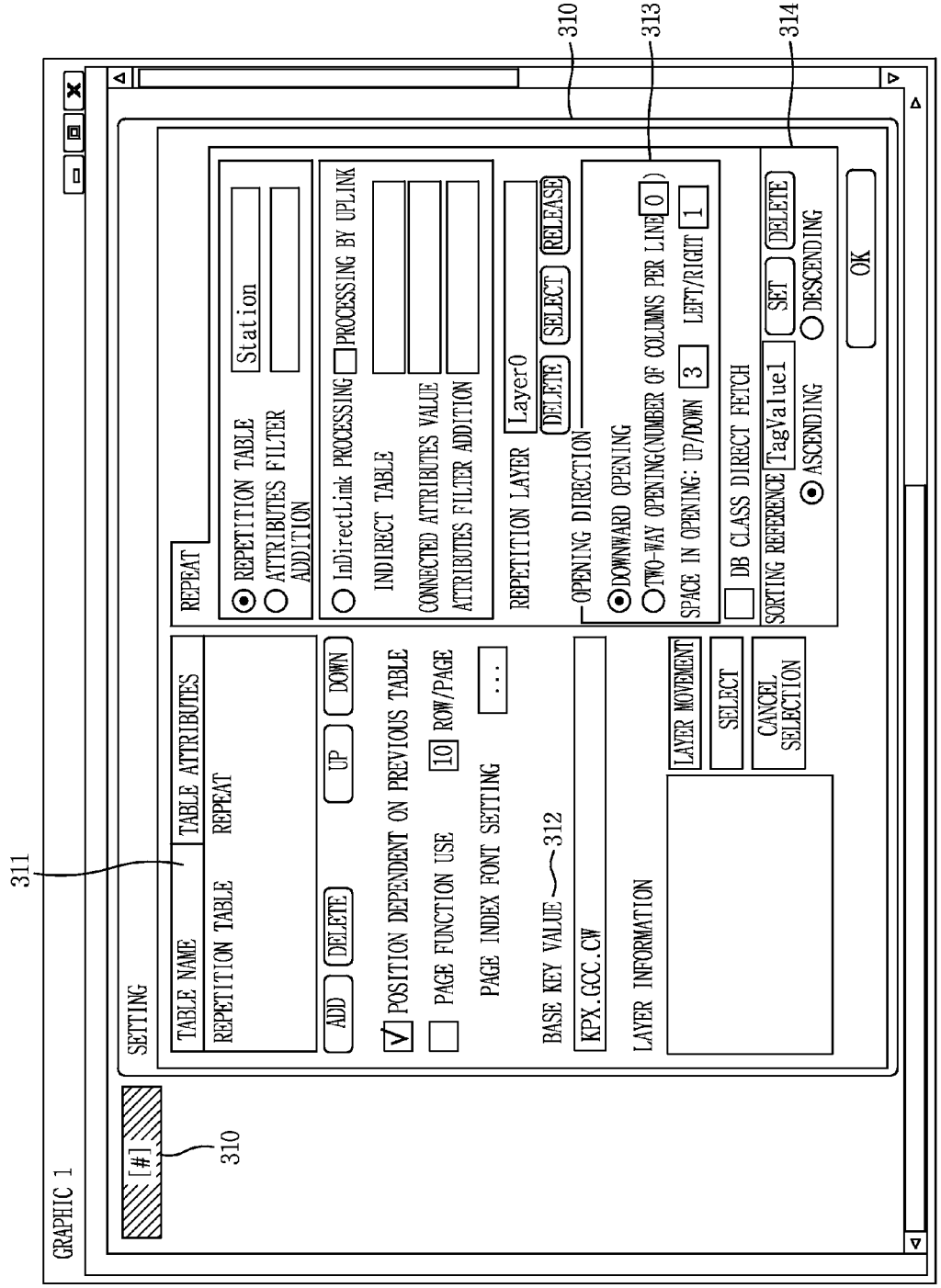
FIGS. 3 and 4 are exemplary diagrams for describing a form value input for generating a repetition table displayed according to a preferred embodiment of the present invention.
Figure 4:
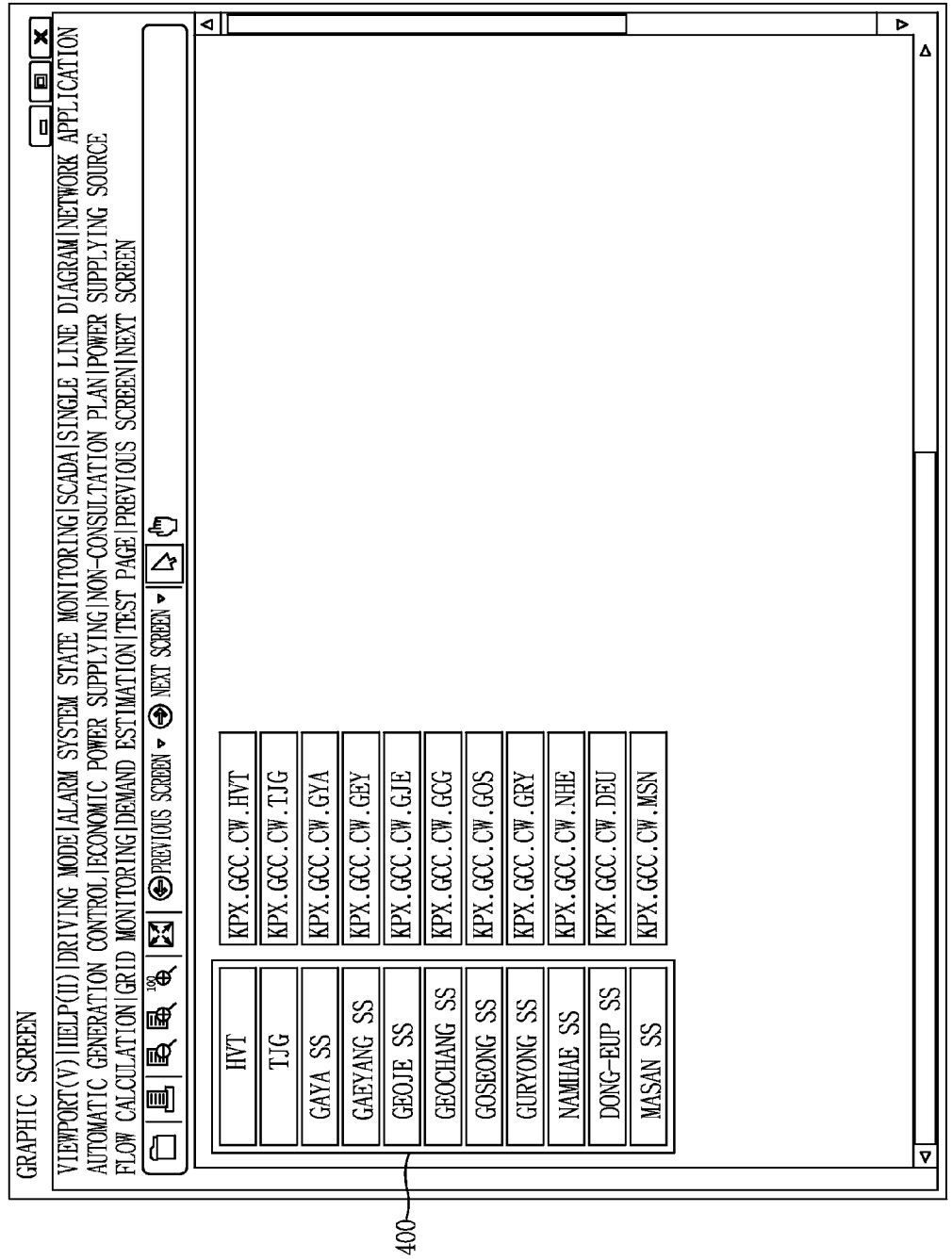

FIG. 2 is a flowchart illustrating a repetition table display operation according to an embodiment of the present invention, and FIGS. 3 and 4 are exemplary diagrams for describing a form value input for generating a repetition table displayed according to an embodiment of the present invention.

Referring to FIGS. 2 to 4, in step S202, the control unit 150 receives a table generation request signal which is input through the user input unit 120 according to manipulation of a user. The table generation request signal may be generated by the selective manipulation of the user based on a separate input request menu, or as illustrated in FIG. 3, when the user selects a layer 310 which is displayed by default on a table display screen, the table generation request signal may be generated in response to the user selection. The control unit 150 may control the display unit 140 so as to enter a table generation menu in response to the table generation request signal.

Therefore, in response to the table generation request signal, as illustrated in FIG. 3, the control unit 150 may control the display unit 140 so as to display a table generation window 310 (S204).

The control unit 150 may receive a new table addition request signal which is input through the user input unit 120 according to manipulation of the user based on the table generation window 310, and receive information data (hereinafter simply referred to as data) having a new tabular form. The new table addition request signal, as illustrated in FIG. 3, may be generated by menu selection for addition of a menu. In step S206, the control unit 150 may receive data (see a touch switch region referred to by reference numeral 311 in FIG. 3) of a name and a form of a table which is to be generated based on the table generation window 310.

When the data of the tabular form is receives in step S206, the control unit 150 may receive a base key value 312 of a table which is to be generated in step S208. Here, the base key value may be a data name of the table which is to be generated. Also, when the user set a form of a table to a repetition table, the control unit 150 may receive, from the user input unit 120, data about a display form for an opening direction and the number of lines of a table (see a touch switch region referred to by reference numeral 313 in FIG. 3).

In step S210, the control unit 150 may receive setting data of a repetition table from the user input unit 120. In step S212, the control unit 150 may receive, from the user input unit 120, data having various sorting forms based on an alphabetical order or a reverse alphabetical order as information about a table which is to be generated.

When an input of condition information of a generated table is completed in step S214, the control unit 150 may read corresponding setting input data in step S216, and command the table generation unit 130 to generate a table based on the corresponding setting input data in step S218.

Also, in step S220, the control unit 150 may control the display unit 140 so as to display the table generated by the table generation unit 130.

That is, the control unit 150 may control the display unit 140 so as to display data of a table on the basis of a sorting method (i.e., the alphabetical order) which is set as illustrated in FIG. 4 (see a display region referred to by reference numeral 400 in FIG. 4), based on various table generation condition input information which is input as illustrated in FIG. 3.

Figure 5:
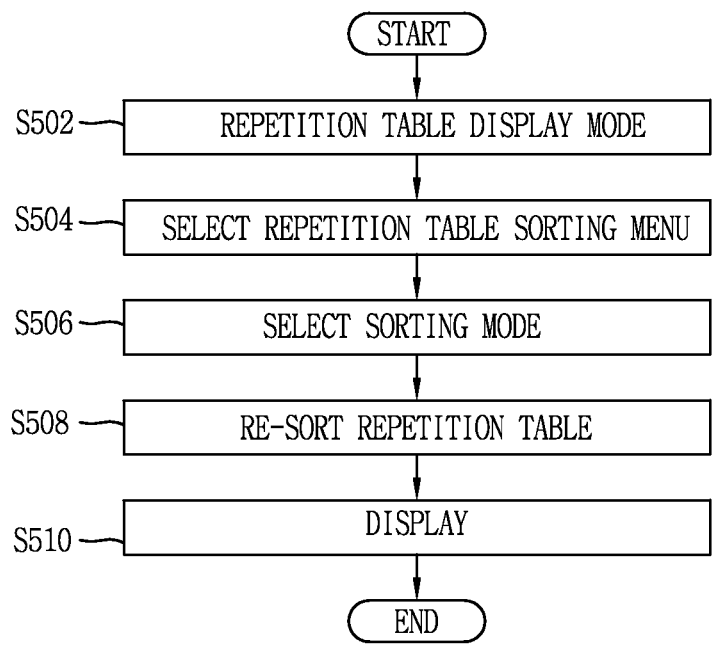
FIG. 5 is a flowchart illustrating a data sorting operation of a repetition table according to a preferred embodiment of the present invention.
Figure 6:
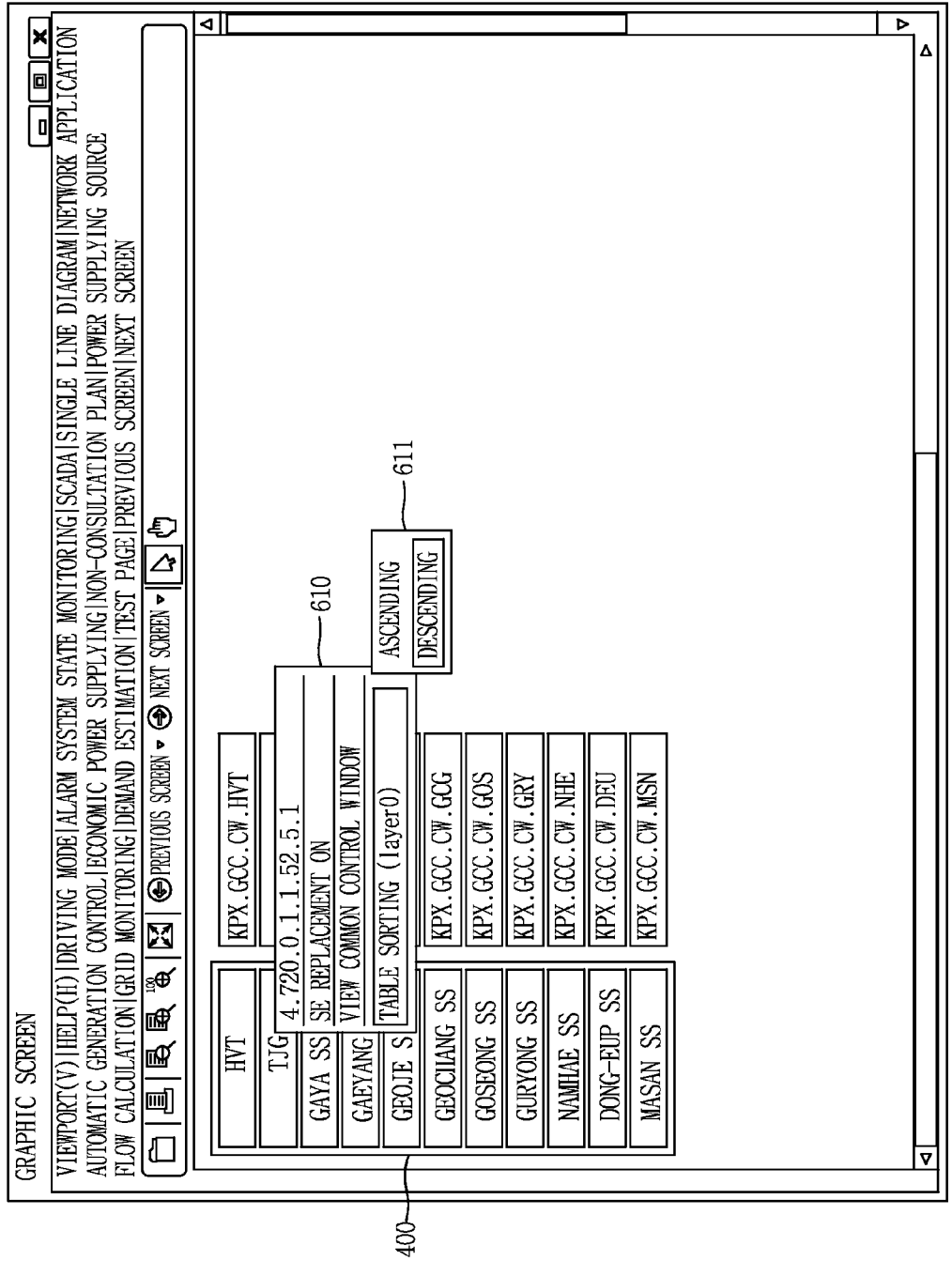
FIGS. 6 and 7 are exemplary diagrams for describing a data sorting operation of a repetition table according to a preferred embodiment of the present invention.
Figure 7:
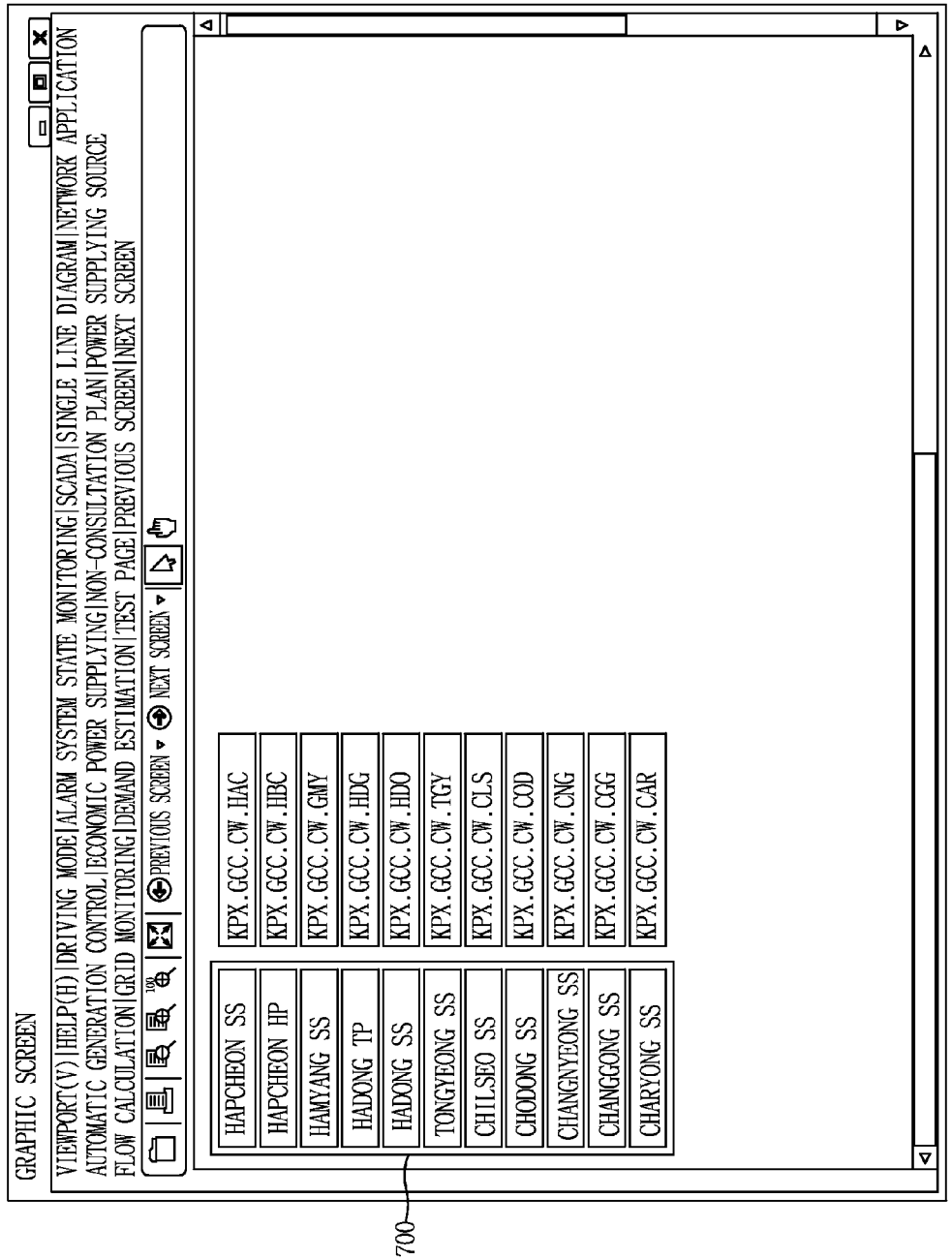

FIG. 5 is a flowchart illustrating a data sorting operation of a repetition table according to an embodiment of the present invention, and FIGS. 6 and 7 are exemplary diagrams for describing a data sorting operation of a repetition table according to an embodiment of the present invention.

In a step S502 of a repetition table display mode where a repetition table which is generated as illustrated in FIGS. 3 and 4 according to an operation of FIG. 2, a repetition table is displayed as illustrated in FIG. 6, the control unit 150 according to an embodiment of the present invention may receive a selection signal input of a sorting menu window (see a display region referred to by reference numeral 610 in FIG. 6) in step S504. A display operation based on selection of a sorting menu may be executed in response to a lower popup window input in a table display window or an input in a separate menu screen.

When the user selects a sorting menu through the user input unit 120, in order for the user to select a selection window (see reference numeral 611 in FIG. 6) of a sorting mode from the sorting menu, the control unit 150 may control the display unit 140 so as to display the selection window 611 of the sorting mode.

When the user selects the selection window 611 of the sorting mode as illustrated in FIG. 6, the control unit 150 may re-sort and display data of a table (i.e., re-sort and display the data in the reverse alphabetical order) as illustrated in FIG. 7 (see a re-sorted table 700 in FIG. 7), based on the selected sorting mode. FIG. 7 illustrates a screen display example of the display unit 140, and in particular, FIG. 7 illustrates that data of a displayed table is changed from a sorting mode of the alphabetical order to a sorting mode of the reverse alphabetical order, and is displayed. In addition, data of a displayed table may be displayed based on various sorting modes. The various sorting modes include various sorting conditions about an alphabetical order/reverse alphabetical order alphabet of an initial phoneme, digits, or a time sequence of input data.

Figure 8:
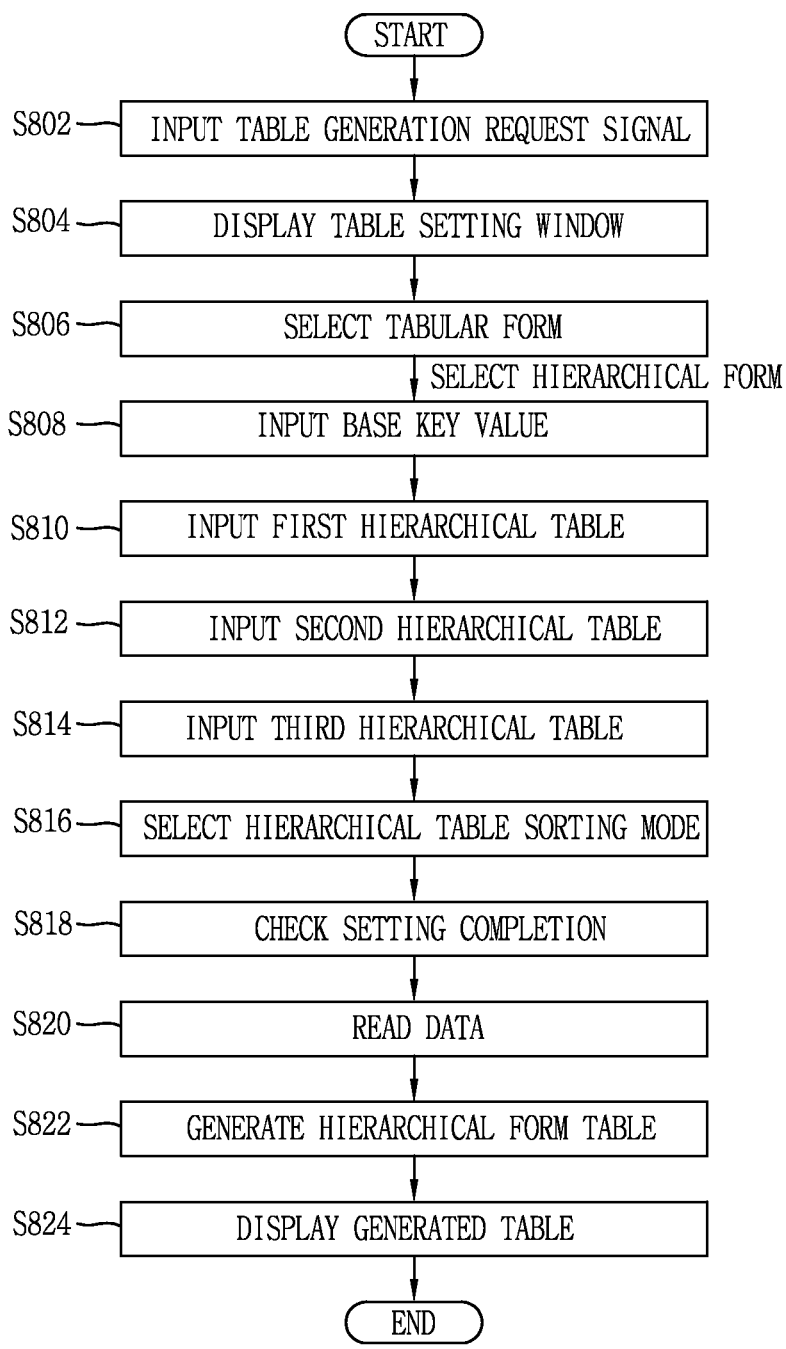
FIG. 8 is a flowchart illustrating a hierarchical table display operation according to a preferred embodiment of the present invention.
Figure 9:
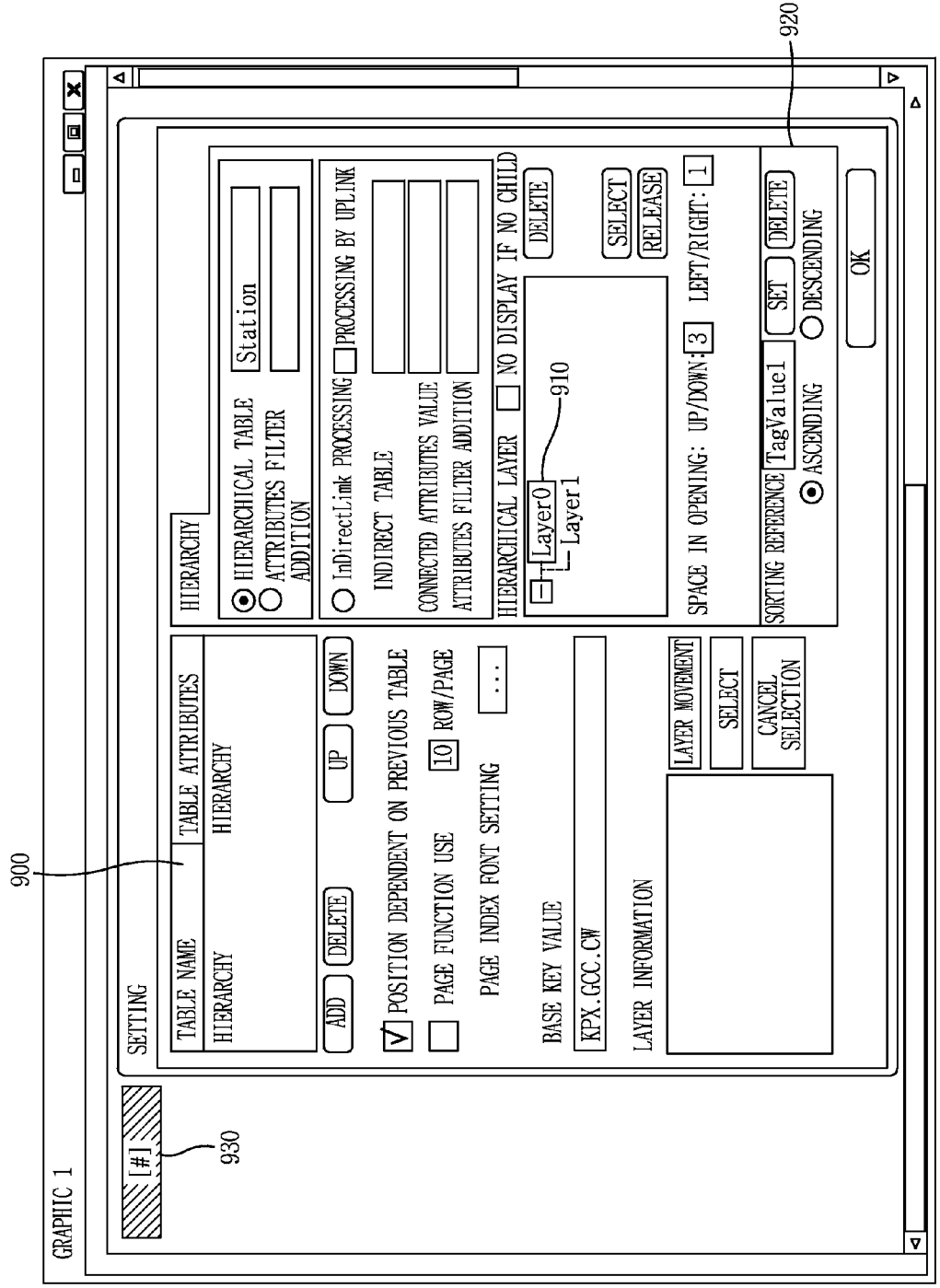
FIGS. 9 and 10 are exemplary diagrams for describing a hierarchical table display operation according to a preferred embodiment of the present invention.
Figure 10:
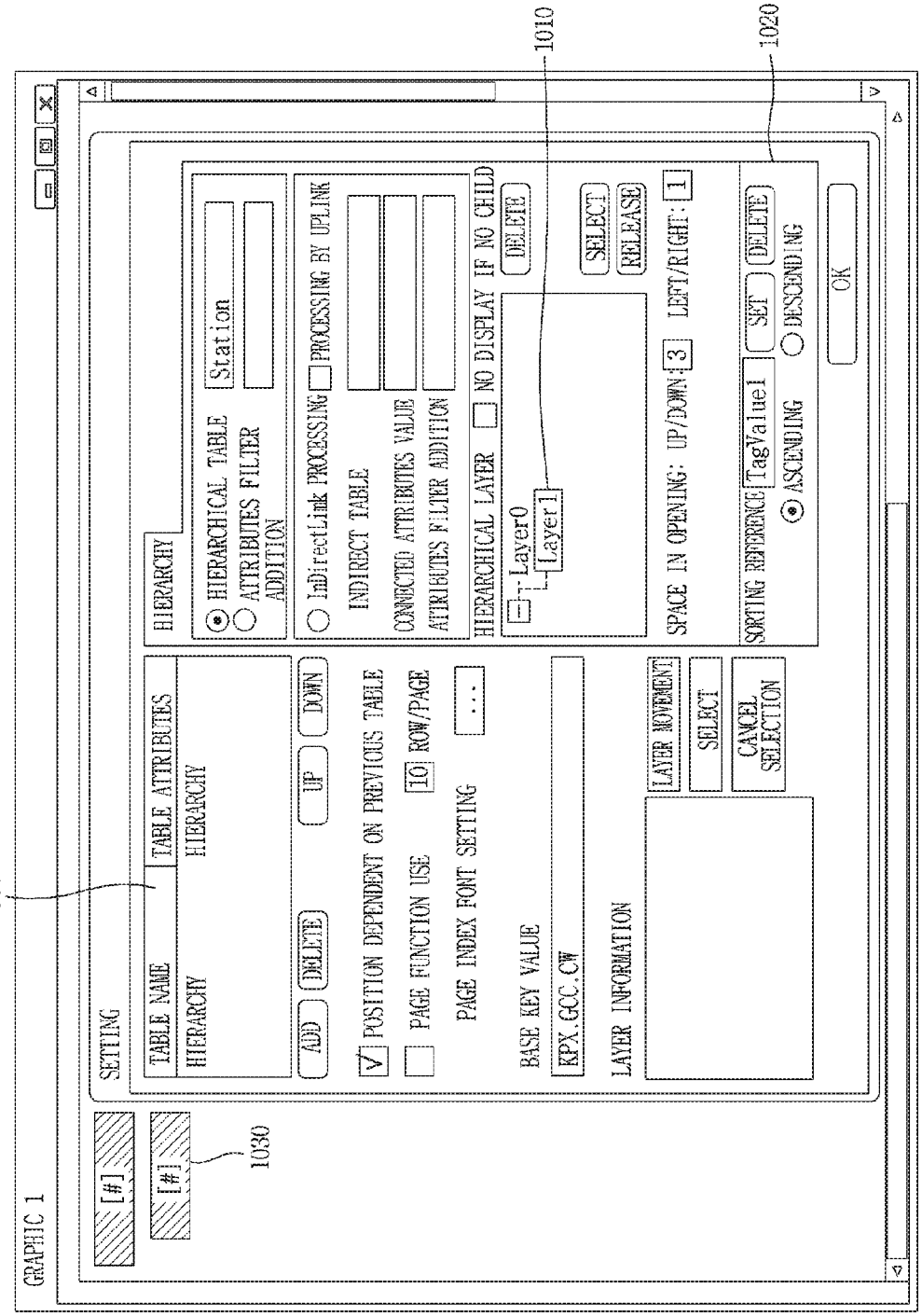

FIG. 8 is a flowchart illustrating a hierarchical table display operation according to an embodiment of the present invention, and FIGS. 9 and 10 are exemplary diagrams for describing a hierarchical table display operation according to an embodiment of the present invention.

Referring to FIGS. 8 to 10, in step S802, the control unit 150 according to an embodiment of the present invention receives a table generation request signal from the user input unit 120 according to manipulation of a user. When the user touches and selects a layer 930 displayed by default in a separate request menu screen (not shown) or a table setting display screen as illustrated in FIG. 9, a table generation request signal may be generated by the user input unit 120, and the control unit 150 may control the display unit 140 so as to enter a table generation menu in response to the table generation request signal.

That is, in step S804, the control unit 150 may control the display unit 140 so as to display a table generation window as illustrated in FIG. 9 in response to the table generation request signal.

In step S806, the control unit 150 may receive a new table addition request signal, which is generated by the use's touch in the table generation window, from the user input unit 120, and receive an input of new tabular form selection data from the user input unit 120. The new table addition request signal, as illustrated in FIG. 9, may be generated by an input based on a touch (see a selection bar in which "addition" is put in FIG. 9). The table generation window may include an item selection region (see reference numeral 900), which enables the user to select and input a name and a form of a table, and a selection region (see reference numeral 920) that enables the user to select and input a sorting reference of the table. As illustrated in FIG. 9, an operation of generating a hierarchical table will be described as an example.

When a form setting of a table is completed, the control unit 150 may receive a base key value which is a data name of table input by manipulation of the user input unit 120 (i.e., a touch switch) by the user (S808), and moreover receive data of tables which are to be generated as a hierarchical table input by manipulation of the user input unit 120 by the user.

The control unit 150 may receive, from the user input unit 120, selection data of a plurality of tables included in the hierarchical table for generating the hierarchical table. That is, in step S810, the control unit 150 receives a first hierarchical table, which is to be displayed as an uppermost layer of the hierarchical table, from the user input unit 120. Here, as illustrated in FIG. 9, the first hierarchical table is an item which is to be displayed as an uppermost hierarchical table in a measurement layer information window 910, and the uppermost hierarchical table may be selected by the user and may be transferred to the control unit 150 by the user input unit 120.

Subsequently, similarly to an input of the first hierarchical table, the control unit 150 may receive a table input of a second layer, which is a lower layer of a first layer, from the user input unit 120 in step S812. In step S812, as illustrated in FIG. 10, the control unit 180 may receive a second hierarchical table from the user input unit 120 according to selection of the user which is performed through a measurement layer information window 1010. Subsequently, in step S814, the control unit 180 may receive a third layer table from the user input unit 120 according to selection of the user.

When an input of a plurality of hierarchical tables is completed, as illustrated in FIGS. 9 and 10, the control unit 150 may receive, from the user input unit 120, an input of selection data (see a window referred to by reference numeral 920 in FIG. 9 and a window referred to by reference numeral 1020 in FIG. 10) of the user for a sorting reference of each of the first layer and the second layer in step S816.

When a setting input is completed, the control unit 150 may read a completed setting form and data in step S820, control the table generation unit 130 so as to generate a table having a hierarchical form in step S822, and control the display unit 140 so as to display the generated table in step S824.

Figure 11:
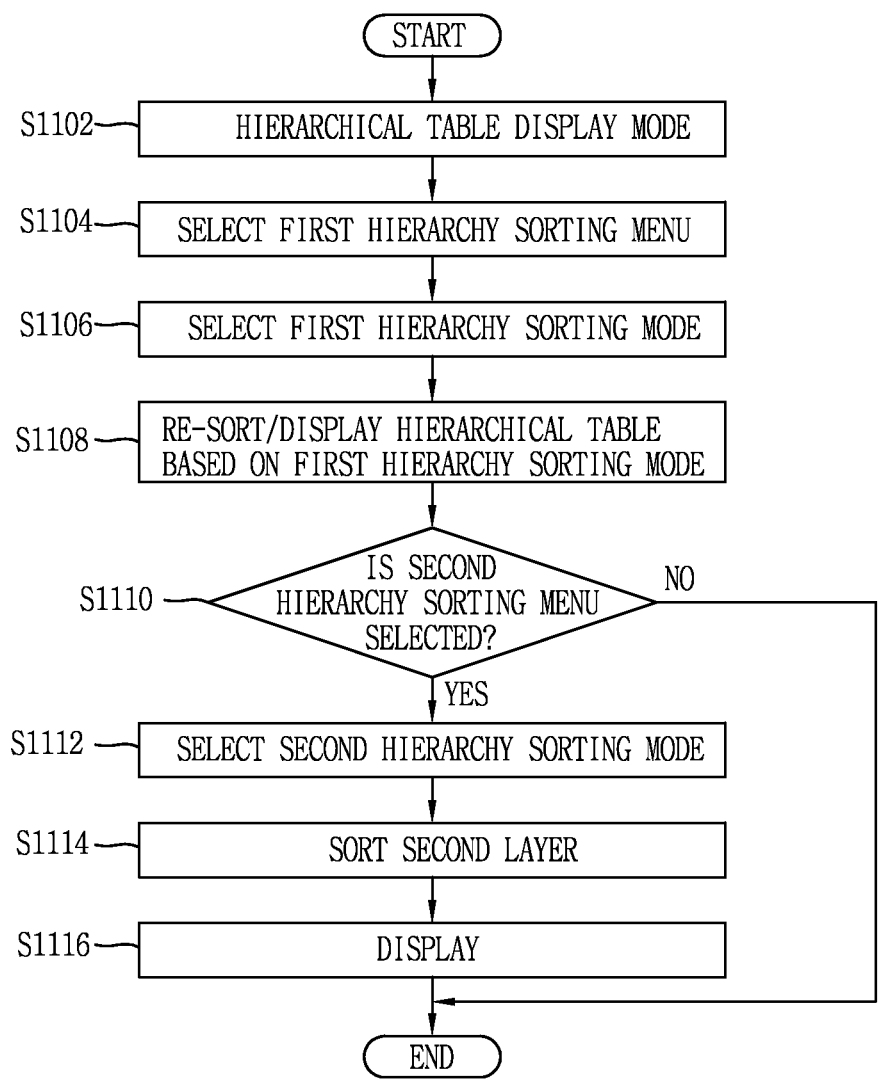
FIG. 11 is a flowchart for describing a data sorting operation of a repetition table according to a preferred embodiment of the present invention.

FIG. 11 is a flowchart for describing a data sorting operation of a repetition table according to an embodiment of the present invention, and FIGS. 12 to 16 are exemplary diagrams for describing a data sorting operation of a repetition table according to an embodiment of the present invention.

The present embodiment will be described in detail with reference to FIGS. 11 to 16. In step S1102, as shown in the operations of FIGS. 8 to 10 according to an embodiment of the present invention and an exemplary diagram, a hierarchical table display mode may be performed in which the display unit 140 displays a hierarchical table generated by the table generation unit 130 according to control by the control unit 150 as illustrated in FIG. 12.

Figure 12:
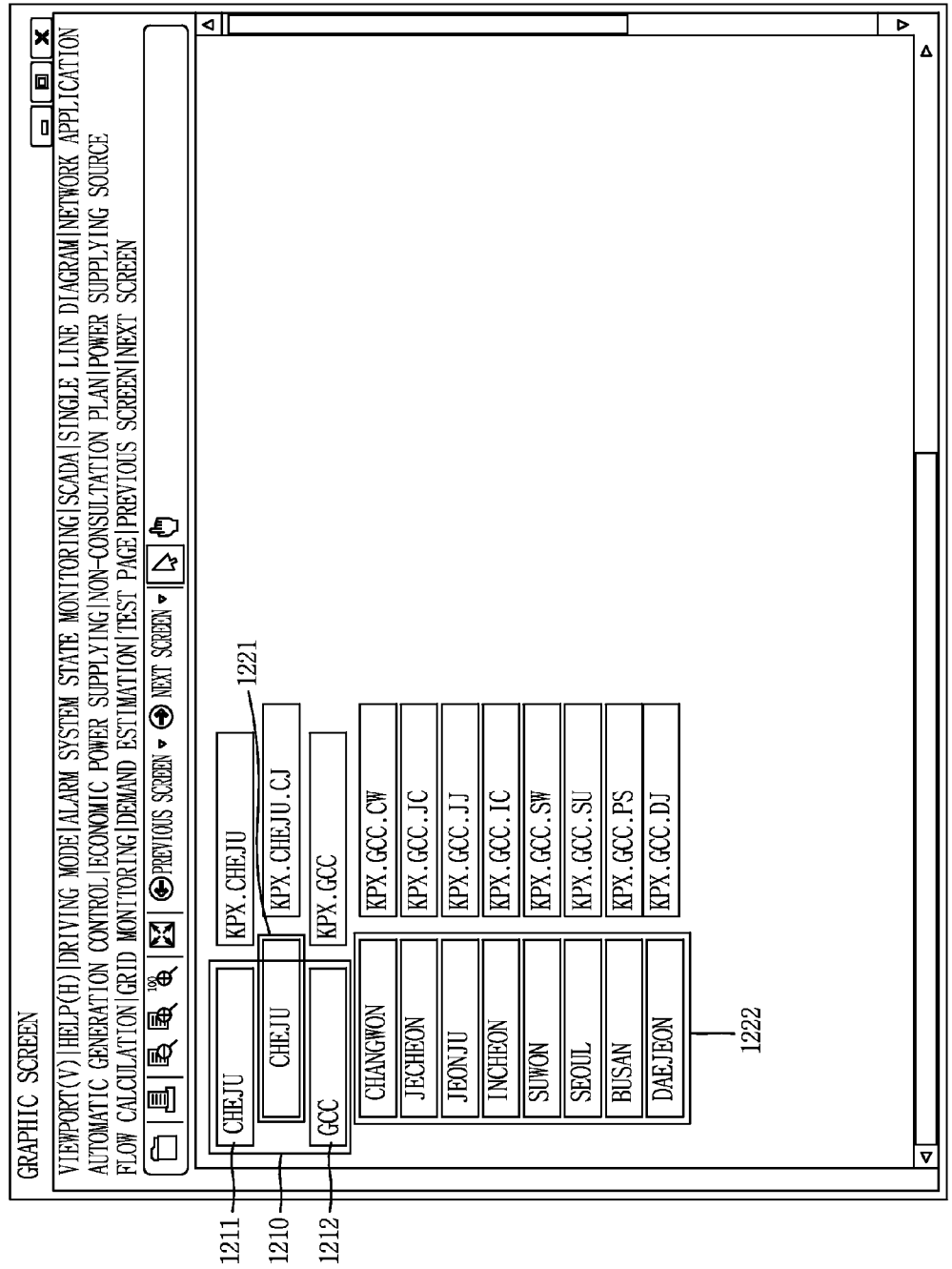
FIGS. 12 to 16 are exemplary diagrams for describing a data sorting operation of a repetition table according to a preferred embodiment of the present invention.

FIG. 12 illustrates hierarchical tables of two groups, and each of the two groups includes a plurality of first hierarchical tables 1211 and 1212 and a plurality of second hierarchical tables 1221 and 1222.

Figure 13:
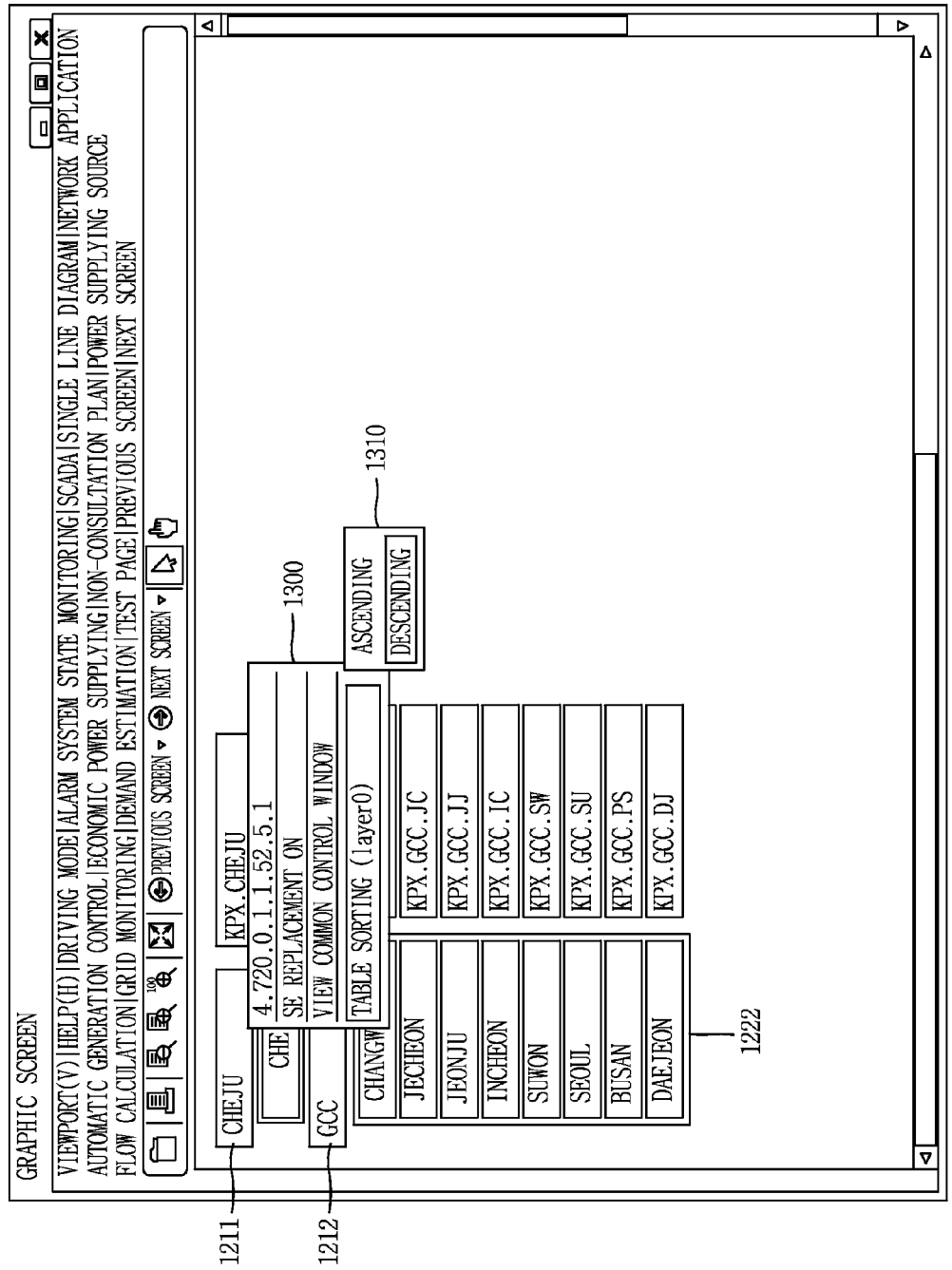

The control unit 150, as illustrated in FIG. 13, may receive a selection input of a sorting mode for one of a first layer and a second layer. That is, as illustrated in FIG. 13, when a user selects a sorting menu for data of a first hierarchical table through a popup window 1300 in step S1104, and then selects a sorting mode (i.e., one of ascending sorting of descending sorting) from a sorting mode display window 1310 included in the sorting menu in step S1106, the control unit 150 may receive, from the user input unit 120, sorting request data of the first hierarchical table and selection data (i.e., data of a descending sorting mode) of the sorting mode included in the sorting menu.

Figure 14:
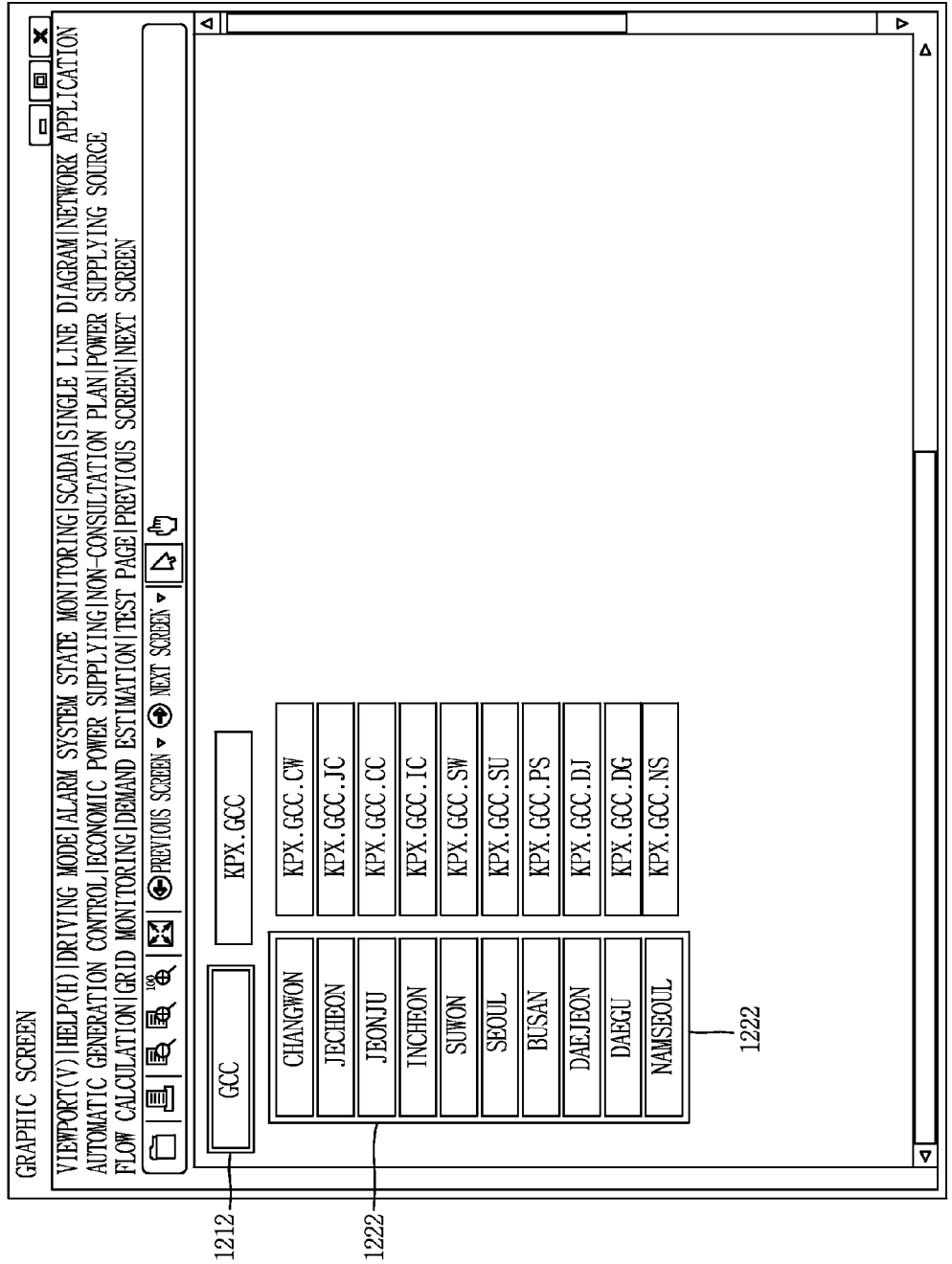

When one of various sorting modes such as ascending sorting and descending sorting is selected, as illustrated in FIG. 14, the control unit 150 may re-sort and display the first hierarchical table 1212 of each group, based on the selected sorting mode in step S1108. In this case, data of the table 1222 of second to Nth layers corresponding to a lower layer of the first layer may be moved in interlocking with the re-sorted first layer.

Figure 15:
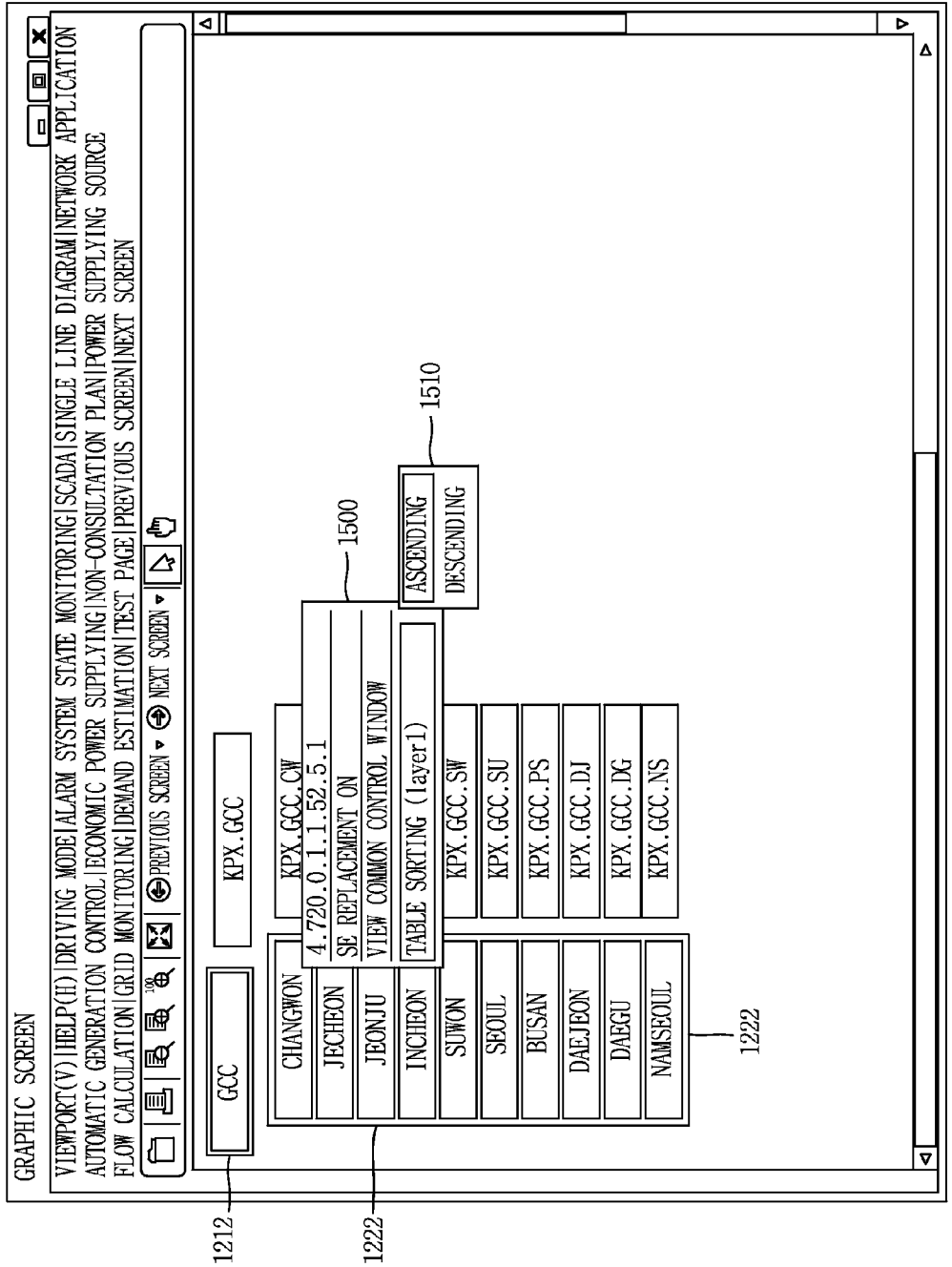

In step S1110, the control unit 150 may determine whether a sorting menu of the second hierarchical table 1222 is selected by the user and is input from the user input unit 120, in a state where data of a first hierarchical table are re-stored and displayed. As illustrated in FIG. 15, when selection of a sorting menu for data of the second hierarchical table 1222 which is selected by the user through a menu window 1500 is input, and then the user selects a sorting mode (i.e., one of ascending soring of descending sorting) from a sorting mode display window 1510 included in the sorting menu in step S1112, the control unit 150 may receive, from the user input unit 120, sorting request data of the second hierarchical table and selection data (i.e., data of an ascending sorting mode) of the sorting mode included in the sorting menu.

Figure 16:
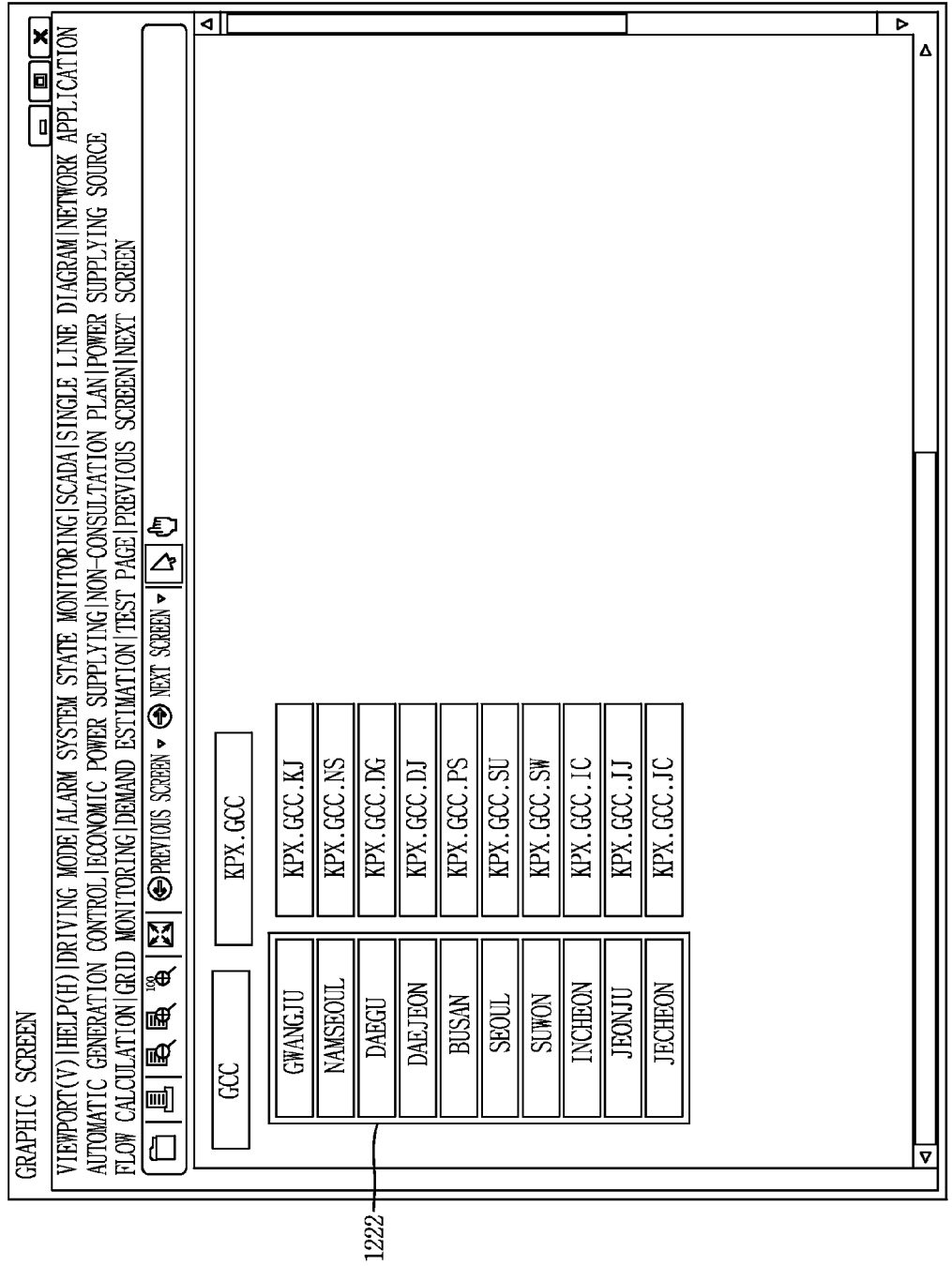

The control unit 150 may re-sort data of a second hierarchical table on the basis of the selected sorting mode in step S1114, and as illustrated in FIG. 16, may display the re-sorted data in the display unit 140 in step S116. Re-sorting of the second layer may be limited to data of the second hierarchical table included in one first layer, and the second layer is sorted separately from data of another first layer.

As described above, according to the embodiments of the present invention, since it is not required to edit separate data for a data table, a reoperation of a system is not needed.

Moreover, according to the embodiments of the present invention, a user interface which matches a user's requirement can be provided, and thus, a table display form can be easily changed, thereby increasing the use convenience of the user.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A data display method for an energy management system, the data display method comprising:
   receiving, via a user input unit, a table generation request including a base key value which is a data name of the table;
   receiving, via the user input unit, selection information in a table display form configured for generating a hierarchical table and selection information of sorting the data;
   receiving, via the user input unit, a selection of a plurality of layers of the table display form;
   reading, by a control unit, data to be included in the hierarchical table;
   generating, via a table generation unit, the hierarchical table for the data according to the selection information in the table display form according to control by the control unit;
   sorting, by the control unit, the data according to the input to the plurality of layers of the table display form;
   displaying the sorted data of the hierarchical table in a display unit;
   receiving, via the user input unit, a sorting request input for the displayed data; and
   re-sorting, by the control unit, the displayed data based on the received sorting request input, and displaying the re-sorted data in the display unit; and
   wherein the hierarchical table comprises the plurality of layers including an uppermost layer to a lowermost layer and the uppermost layer corresponds to a first hierarchical table comprising a plurality of data, and re-sorting the displayed data comprises:
   sorting the plurality of data of the first hierarchical table;
   displaying the sorted first hierarchical table in the display unit in response to the sorting request input for the plurality of data of the first hierarchical table;
   displaying data of a lower hierarchical table at a lower position in correspondence with a sorting order of the first hierarchical table when the plurality of data of the first hierarchical table are sorted; and
   re-sorting data of the lower hierarchical table when a re-sorting request input for data of the lower hierarchical table is received and displaying the re-sorted data.

2. The data display method of claim 1, further comprising:
   inputting, by the user input unit, the hierarchical table to be displayed in a tree form,
      wherein a table input to be displayed in the tree form configured as a plurality of hierarchical tables to be displayed are sequentially input in the tree form.

\* \* \* \* \*